US007664667B1

(12) United States Patent　　　(10) Patent No.: US 7,664,667 B1
Ruppelt et al.　　　(45) Date of Patent: Feb. 16, 2010

(54) METHOD, SYSTEM, AND PROGRAM PRODUCT FOR ON-LINE SERVICE CALL SCHEDULING

(76) Inventors: Kevin Michael Ruppelt, 14304 Wakefield Pl., Louisville, KY (US) 40245; Jeffrey Karl Skilling, 620 Big Rock Dr., Westerville, OH (US) 43082; Ian Killeen Heckman, 520 Vineleaf Dr., Louisville, KY (US) 40222; Glenn William Cornell, 6803 Fordham La., Louisville, KY (US) 40291; Charles David Lowry, 1058 Chapel Creek Trail, New Albany, IN (US) 47150

( * ) Notice: Subject to any disclaimer, the term of this patent is extended or adjusted under 35 U.S.C. 154(b) by 0 days.

(21) Appl. No.: 09/480,589

(22) Filed: Jan. 10, 2000

(51) Int. Cl.
    *G06F 9/46* (2006.01)
(52) U.S. Cl. .............................. 705/8; 705/9
(58) Field of Classification Search .............. 705/1, 705/7, 8, 9; 701/29
    See application file for complete search history.

(56) References Cited

U.S. PATENT DOCUMENTS

| | | | | |
|---|---|---|---|---|
| 5,615,121 A | * | 3/1997 | Babayev et al. | 705/9 |
| 5,737,728 A | * | 4/1998 | Sisley et al. | 705/8 |
| 5,875,430 A | * | 2/1999 | Koether | 705/1 |
| 5,920,846 A | * | 7/1999 | Storch et al. | 705/7 |
| 5,943,652 A | * | 8/1999 | Sisley et al. | 705/9 |
| 5,956,024 A | | 9/1999 | Strickland et al. | |
| 5,960,406 A | * | 9/1999 | Rasansky et al. | 705/9 |
| 5,982,863 A | | 11/1999 | Smiley et al. | |
| 5,987,105 A | * | 11/1999 | Jenkins et al. | 379/106.01 |
| 6,094,639 A | * | 7/2000 | Kubota | 705/1 |
| 6,208,865 B1 | * | 3/2001 | Veerasamy | 455/450 |
| 6,292,806 B1 | * | 9/2001 | Sandifer | 707/104.1 |
| 6,311,162 B1 | * | 10/2001 | Reichwein et al. | 705/1 |
| 6,327,363 B1 | * | 12/2001 | Henderson et al. | 379/265.01 |

(Continued)

OTHER PUBLICATIONS

"GE to open new division", Hampton Roads Business Contact, Sep. 1993 [retrieved Apr. 30, 2003], vol. 18, Issue 9, 2 pages, retrieved from: Proquest Direct.*

(Continued)

*Primary Examiner*—Bradley Bayat
*Assistant Examiner*—Johnna Loftis
(74) *Attorney, Agent, or Firm*—George L. Rideout, Esq.; Armstrong Teasdale LLP

(57) ABSTRACT

A computing environment or system is disclosed for use by a homeowner for real-time, on-line scheduling of a visit by technician or repairman to diagnose and, if authorized by the user, repair a home appliance such as a refrigerator or washing machine. The system is desirably accessible over the Internet by a customer using a Web browser wherein an interactive screen prompts the user and suggests product information and a nature of the problem. The system desirably obtains and provides to the user a schedule of available appointments for a manufacturer's factory service based on the product and customer information and location of the product. Where factory service is not available in the locality of the user, the system obtains and provides one or more local manufacturer authorized service providers. After selection of a service provider by the user, available appointments are provided. The user selects and confirms one of the appointments. Thereafter, the service provider is notified, for example, automatically by e-mail or facsimile, by the system and is requested to confirm the appointment with the user.

61 Claims, 9 Drawing Sheets

U.S. PATENT DOCUMENTS

| | | | | |
|---|---|---|---|---|
| 6,542,601 | B1* | 4/2003 | Hernandez et al. | 379/265.01 |
| 6,826,539 | B2* | 11/2004 | Loveland | 705/7 |
| 6,829,584 | B2* | 12/2004 | Loveland | 705/7 |
| 6,959,235 | B1* | 10/2005 | Abdel-Malek et al. | 701/33 |
| 7,188,073 | B1* | 3/2007 | Tam et al. | 705/9 |
| 2001/0011225 | A1* | 8/2001 | O'Connor et al. | 705/9 |
| 2001/0053980 | A1* | 12/2001 | Suliman et al. | 705/1 |

OTHER PUBLICATIONS

Remich, Norman C Jr., "Connected to Consumers", Jul. 1995 [retrieved Apr. 30, 2003], vol. 43, Issue 7, 3 pages, retrieved from: Proquest Direct.*

Radding, Alan, "GE Answers Call to Evolve 10-Year-Old Help Line", Computerworld, Jan. 20, 1992 [retrieved Apr. 30, 2003], vol. 26, Issue 3, 4 pages, retrieved from: Proquest Direct.*

Stevens, Larry, "How GE uses technology to turn back the clock", Computerworld, Nov. 6, 1989 [retrieved Apr. 30, 2003], 2 pages, retrieved from: Proquest Direct.*

"GEA: Making Things Happen-Consumer Friendly", Appliance Manufacturer, Jan. 1992 [Apr. 30, 2003], vol. 40, Issue 1, 5 pages, retrieved from: Proquest Direct.*

McClenahen, John S., "Benefiting from the 'Net", Industry Week, Nov. 17, 1997 [Apr. 30, 2003], vol. 246, Issue 21, 2 pages, retrieved from: Proquest Direct.*

Wilfore, John, "Breaking Down the Barriers to Communication", Sales and Marketing Management, Jan. 1991 [retrieved Apr. 30, 2003], vol. 143, Issue 1, 2 pages, retrieved from: Proquest Direct.*

Remich, Norman C Jr., "Speed Saves the Day", Appliance Manufacturer, Jul. 1995 [retrieved Apr. 30, 2003], vol. 43, Issue 7, 5 pages, retrieved from: Proquest Direct.*

Davenport, Tom, "Managing Customer Knowledge", CIO Magazine, Jun. 1, 1998 [retrieved Apr. 30, 2003], 4 pages, retrieved from: Google.com.*

"A Dozen years of Having all the Answers", Dealerscope Merchandising, Aug. 1993 [Apr. 30, 2003], vol. 35, Issue 8, 2 pages, retrieved from: Proquest Direct.*

Tax et al., "Recovering and learning from service failure", Sloan Management Review, Fall 1998 [retrieved Apr. 30, 2003], vol. 40, Issue 1, retrieved from: Google.com.*

Voyles, Susan, "Calls help companies give us what we want", USA Today, May 21, 1987 [retrieved Apr. 30, 2003], 2 pages, retrieved from: Proquest Direct.*

Customer Support System, www.circuitcity.com, Apr. 29, 1998 [retrieved Oct. 15, 2004], pp. 1-35, retrieved from: google.com and archive.org.*

Whirpool, "Appliance Corner", www.whirlpoolcorp.com, Oct. 18, 2000 [retrieved Oct. 6, 2004], pp. 1-14, retrieved from: google.com and archive.org.*

Sears HomeCentral, www.sear.com, May 8, 1999 [retrieved Oct. 5, 2004], pp. 1-5, retrieved from: google.com and archive.org.*

"House Calls are extending sales", Los Angeles Times, Aug. 23, 1995 [retrieved Oct. 6, 2004], pp. 1-3, retrieved from: Proquest Direct.*

Nevin, Fred, "Appliance Services Pad the Sale", Dealerscope Consumer Electronics Marketplace, Apr. 1996 [retrieved Oct. 6, 2004], vol. 38, Iss. 4, pp. 1-2, retrieved from: Proquest Direct.*

Ladendorf, Kirk, "Need Help? MaxServ answers the Calls", Austin American Statesman, Jan. 2, 1993 [retrieved Oct. 6, 2004], pp. 1-2, retrieved from: Proquest Direct.*

Totty, Michael, "As Big Firms Farm Out", Wall Street Journal, Jul. 30, 1993 [retrieved Oct. 6, 2004], pp. 1-2, retrieved from: Proquest Direct.*

OpenUPTIME, www.metrix-inc.com, Jun. 28, 1998 [retrieved Feb. 15, 2005], pp. 1-33, retrieved from: Google.com and archive.org.*

"RepairNow.com and National Electronics Warranty 'Dot.com' customer service structure", PR Newswire, Dec. 30, 1999 [retrieved Feb. 17, 2005], pp. 1-2, retrieved from: Dialog, file 613.*

"Accent awarded Amana customer service contract", www.accentonline.com, Jun. 10, 1999 [retrieved Feb. 17, 2005], pp. 1-2, retrieved from: Google.com.*

Frable, Foster Jr., "Manage Equipment maintenance, replacement with software", Nation's Restaurant News, Jan. 1, 1996 [retrieved Jul. 21, 2005], vol. 30, No. 1, pp. 1-4, retrieved from: Dialog, file 15.*

Somheil, Timothy, "Bringing good things to market", Appliance, Jun. 1997 [retrieved Mar. 13, 2006], vol. 54, No. 6, pp. 1-6, retrieved from: Dialog, file 148.*

The Geek Squad, www.geeksquad.com, May 28, 1999 [retrieved Dec. 20, 2006], pp. 1-11, retrieved from: archive.org and google.com.*

ACCRA: Cost of Living Index, www.accra.org, Oct. 1999 [retrieved May 9, 2007], pp. 1-5, retrieved from: Google.com and Archive.org.*

* cited by examiner

| HOME | WHAT'S HOT | ANSWER CENTER | WHERE TO BUY | | QUICK SEARCH |
|---|---|---|---|---|---|
| SHOPPER'S GUIDE | PARTS AND ACCESSORIES | | | | [    ] (GO) |

SCHEDULE SERVICE CALL

REGISTER PRODUCT

SCHEDULE SERVICE

UPDATE SERVICE

PARTS AND ACCESSORIES

EXTENDED WARRANTIES

FAQ'S

USE AND CARE

APPOINTMENT PREFERENCES (CLICK ON CHOICE) — 520

| NEXT WEEK | MON 11/01 | TUE 11/02 | WED 11/03 | THU 11/04 | FRI 11/05 | SAT 11/06 |
|---|---|---|---|---|---|---|
| EARLY 8-12 | ▓ | ▓ | | ▓ | ▓ | ▓ |
| MID DAY 10-2 | | ▓ | | ▓ | ▓ | ▓ — 525 |
| AFTERNOON 1-5 | | ▓ | ▓ | ▓ | ▓ | ▓ — 525 |
| EVENING 3-5 | | | | | ▓ | ▓ |

GREEN BLOCKS INDICATE AVAILABLE TIME SPANS

SPECIAL INSTRUCTIONS

[ CALL AHEAD ...PAGE ME 30 MIN. AHEAD OF TIME, ETC. ] — 540

[ CONTINUE TO CONFIRM SERVICE ] — 530

| HOME | WHAT'S HOT | GE ANSWER CENTER | WHERE TO BUY | | QUICK SEARCH | |
|---|---|---|---|---|---|---|
| SHOPPER'S GUIDE | PARTS AND ACCESSORIES | | | | | GO |

AUTHORIZED SERVICE PROVIDER

REGISTER PRODUCT
SCHEDULE SERVICE
UPDATE SERVICE
PARTS AND ACCESSORIES
EXTENDED WARRANTIES
FAQ'S
USE AND CARE

PLEASE SELECT FROM ONE OF THE FOLLOWING AUTHORIZED SERVICERS...

[SELECT] JOE'S APPLIANCES
(502) 452-0000
13 ELM ST.
ANY CITY, KY 40222

[SELECT] STEVE'S REPAIR
(502) 452-1111
15 ELM ST.
ANY CITY, KY 40220

*FIG. 7*

| HOME | WHAT'S HOT | GE ANSWER CENTER | WHERE TO BUY | | QUICK SEARCH |
| SHOPPER'S GUIDE | PARTS AND ACCESSORIES | | | | [    ] (GO) |

AUTHORIZED SERVICE PROVIDER

PLEASE SELECT YOUR PREFERRED SERVICE WINDOW

APPOINTMENT DATE PREFERENCE (CLICK ON CHOICE) — 820

| NEXT WEEK | MON 11/01 | TUE 11/02 | WED 11/03 | THU 11/04 | FRI 11/05 | SAT 11/06 |
|---|---|---|---|---|---|---|
| | | | | | | |
| | | ▓▓ | | ▓▓ | ▓▓ | |
| | | ▓▓ | | ▓▓ | ▓▓ | |
| | | | | ▓▓ | | |

AN AUTHORIZED SERVICER WILL CALL YOU TO CONFIRM YOUR APPOINTMENT SHORTLY.

SPECIAL INSTRUCTIONS

CALL AHEAD ...PAGE ME 30 MIN. AHEAD OF TIME, ETC.

REGISTER PRODUCT
SCHEDULE SERVICE
UPDATE SERVICE
PARTS AND ACCESSORIES
EXTENDED WARRANTIES
FAQ'S
USE AND CARE

CONFIRM SERVICE — 830

*FIG. 8*

| HOME | WHAT'S HOT | GE ANSWER CENTER | WHERE TO BUY | | QUICK SEARCH |
|------|-----------|------------------|--------------|--|--------------|
| SHOPPER'S GUIDE | PARTS AND ACCESSORIES | | | | [ ] GO |

SERVICE CALL UPDATE

REGISTER PRODUCT
SCHEDULE SERVICE
UPDATE SERVICE
PARTS AND ACCESSORIES
EXTENDED WARRANTIES
FAQ'S
USE AND CARE

APPOINTMENT PREFERENCES (CLICK ON CHOICE)

950

| NEXT WEEK | MON 11/01 | TUE 11/02 | WED 11/03 | THU 11/04 | FRI 11/05 | SAT 11/06 |
|-----------|-----------|-----------|-----------|-----------|-----------|-----------|
| EARLY 8-12 | | | | | | |
| MID DAY 10-2 | | | | | | |
| AFTERNOON 1-5 | | | | | | |
| EVENING 3-5 | | | | | | |

RED BLOCK INDICATES CURRENT SERVICE CALL DATE AND TIME
GREEN BLOCKS INDICATE AVAILABLE TIME SPANS

[ KEEP CURRENT SERVICE CALL ]

SPECIAL INSTRUCTIONS

CALL AHEAD ...PAGE ME 30 MIN. AHEAD OF TIME, ETC.

[ CONTINUE TO CONFIRM SERVICE ]

*FIG. 9*

METHOD, SYSTEM, AND PROGRAM PRODUCT FOR ON-LINE SERVICE CALL SCHEDULING

BACKGROUND OF THE INVENTION

The present invention generally relates to scheduling of service providers, and more particularly, to an on-line method, system, and program product for enabling a homeowner to schedule a service call for repair of a home appliance.

When, an appliance such as, for example, a refrigerator, a washer, a dryer, a dishwasher, etc. requires repair, a homeowner typically telephones a local appliance repair service and schedules a service call. Thereafter, a technician visits the homeowner at the scheduled time to diagnose a problem with the appliance and, if authorized by the homeowner, to repair the appliance.

Typically, the person answering the telephone call for the appliance repair service is often unable to aid the user in identifying the problem with the appliance, unable to provide on estimate for repair of the appliance, and/or unable to determine whether the appliance is covered by a warranty.

There is a need for a real-time, on-line method and system for enabling a homeowner to schedule a service call for repair of an appliance such as a refrigerator, a washer, a dryer, a dishwasher, etc.

SUMMARY OF THE INVENTION

The present invention provides, in a first aspect, a method for enabling scheduling of a service call in a computing environment in which the method includes, for instance, obtaining product information from a user of the computing environment, and automatically providing to the user at least one available appointment for scheduling a service call based on the product information.

The present invention provides, in a second aspect, a method for enabling scheduling of a service call for repair of a home appliance in a computing environment in which the method includes, for instance, obtaining product information at a first computing unit from input of the product information by the user at a second computing unit coupled to the first computing unit via a communications network, and automatically providing from the first computing unit to the second computing unit at least one available appointment for scheduling a service call based on the product information.

The methods and systems desirably may further include selecting or means for selecting the at least one available appointment from a plurality of appointments in which the plurality of appointments is associated with a plurality of service providers at a plurality of regional locations, and determining or means for determining in real-time the at least one available appointment. In addition, suggested product information may be provided to the user for use by the user in providing the product information, a suggested nature of a problem may be provided based on the product information, and do-it-yourself repair information may be provided based on the nature of the problem.

System and computer program products corresponding to the above-summarized methods are also described and claimed herein.

BRIEF DESCRIPTION OF THE DRAWINGS

FIG. 5 is an illustration of one example of an interactive screen for displaying available service call appointments for a factory service provider in accordance with one implementation of the process of FIGS. 2 and 3;

FIG. 7 is an illustration of one example of an interactive screen for displaying available authorized service providers in accordance with one implementation of the process of FIGS. 2 and 3;

FIG. 8 is an illustration of one example of an interactive screen for displaying available service call appointments for selection of a preferred service call appointment by the user in accordance with one implementation of the process of FIGS. 2 and 3; and FIG. 9 is an illustration of one example of an interactive screen for updating a service call appointment in accordance with one implementation of the process of FIGS. 2 and 3.

DETAILED DESCRIPTION OF THE INVENTION

Figure 1:
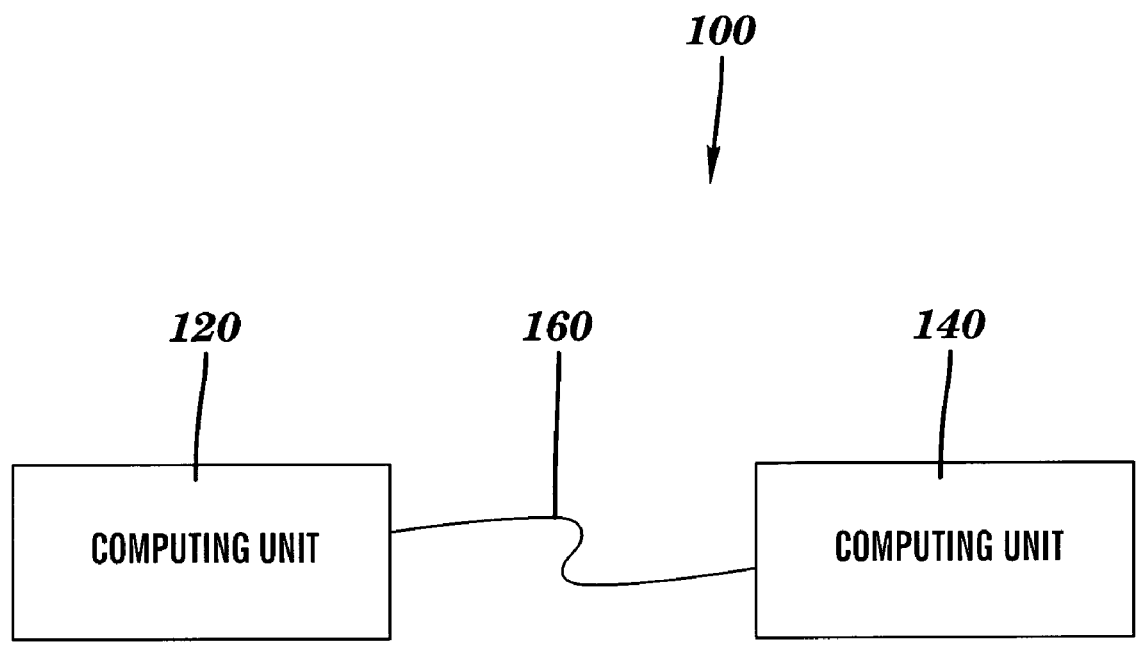
FIG. 1 is a block diagram illustrating one example of a system of the present invention for on-line service call scheduling.

FIG. 1 is a block diagram of one example of a computing environment 100 incorporating and using the capabilities and techniques of the present invention for use in real-time, on-line scheduling of service call appointments. Computing environment 100 is desirably suitable for implementation by an appliance manufacturer for use by an appliance owner, such as, for example, a homeowner, in scheduling a service call for repair of an appliance such as a washing machine, a dryer, a dish washer, a refrigerator, a freezer, a kitchen stove, etc.

Computing environment 100 includes, for instance, at least one computing unit 120 coupled to at least one computing unit 140. In one example, computing unit 120 is a server operated by or maintained on behalf of an appliance manufacturer, while computing unit 140 is a client accessible by a homeowner. Each unit includes, for example, one or more central processing units, memory and one or more input/output devices, as is well known in the art.

Computing unit 120 is based, for instance, on a Honeywell Bull mainframe running GCOS8 operating system and/or a Hewlett Packard HP9000 running a UNIX operating system.

Computing unit 120 desirably includes or has access to memory or data storage units, e.g., hard drive(s), compact disk(s), tape drive(s), etc., for storing various data which is accessed and used in the scheduling of service calls. As explained in greater detail below, examples of data stored and/or accessible by computer unit 120 include, data regarding a plurality of service providers (factory service providers and authorized service providers) located at a plurality of regional locations, data regarding service call appointments for the plurality of service providers, data regarding suggested information regarding a plurality of products or appliances, data regarding suggested problems associated with various products, data regarding suggested do-it-yourself information, and/or data regarding warranty coverage.

Computing unit 140 is, for instance, a personal computer, such as a personal computer executing Microsoft WINDOWS, which runs on the Intel PC architecture.

Computing unit 120 is coupled to computing unit 140 via a network 160. Network 160 may comprise a local area network or a global communications network such as the Internet which comprises a vast number of computers and computer networks that are interconnected through communication links. The interconnected computers exchange information using various services, such as electronic mail, and the World Wide Web ("WWW"). The WWW service allows a server computer system (i.e., Web server or Web site) to send graphical Web pages of information to a remote client computer system. The remote client computer system can then display the Web pages. Each resource (e.g., computer or Web page) of the WWW is uniquely identifiable by a Uniform Resource Locator ("URL"). To view a specific Web page, computing unit 140 specifies the URL for that Web page in a request (e.g., a HyperText Transfer Protocol ("HTTP") request). The request is forwarded to the Web server that supports that Web page. When that Web server receives the request, it sends that Web page to computing unit 140. When computing unit 140 receives that Web page, it typically displays the Web page using a browser. A browser is a special-purpose application program that effects the requesting of Web pages and the displaying of Web pages. Computing unit 140 may use a browser such as Microsoft Internet Explorer® or Netscape®.

Web pages are typically defined using HyperText Markup Language ("HTML"). HTML provides a standard set of tags that define how a Web page is to be displayed. When a homeowner indicates to the browser to display a Web page, the browser sends a request to the server to transfer to computing unit 140 a HTML document that defines the Web page. When the requested HTML document is received by computing unit 140, the browser displays the Web page as defined by the HTML document. The HTML document contains various tags that control the displaying of text, graphics, controls, and other features. The HTML document may contain URLs of other Web pages available on that server computer system or other server computer systems.

The above-described computing environment and/or computing units are only offered as examples. The present invention can be incorporated and used with many types of computing units, computers, processors, nodes, systems, work stations and/or environments without departing from the spirit of the present invention. For example, one or more of the units may be based on the UNIX architecture. Additionally, while some of the embodiments described herein are discussed in relation to servers and clients, such embodiments are only examples. Other types of computing environments can benefit from the present invention and are thus, considered a part of the present invention.

Additionally, in various aspects of the present invention, the client need not be remote from the server. Various aspects of the invention are equally applicable to clients and servers running on the same physical machine, different physical machines or any combinations thereof.

Figure 2:
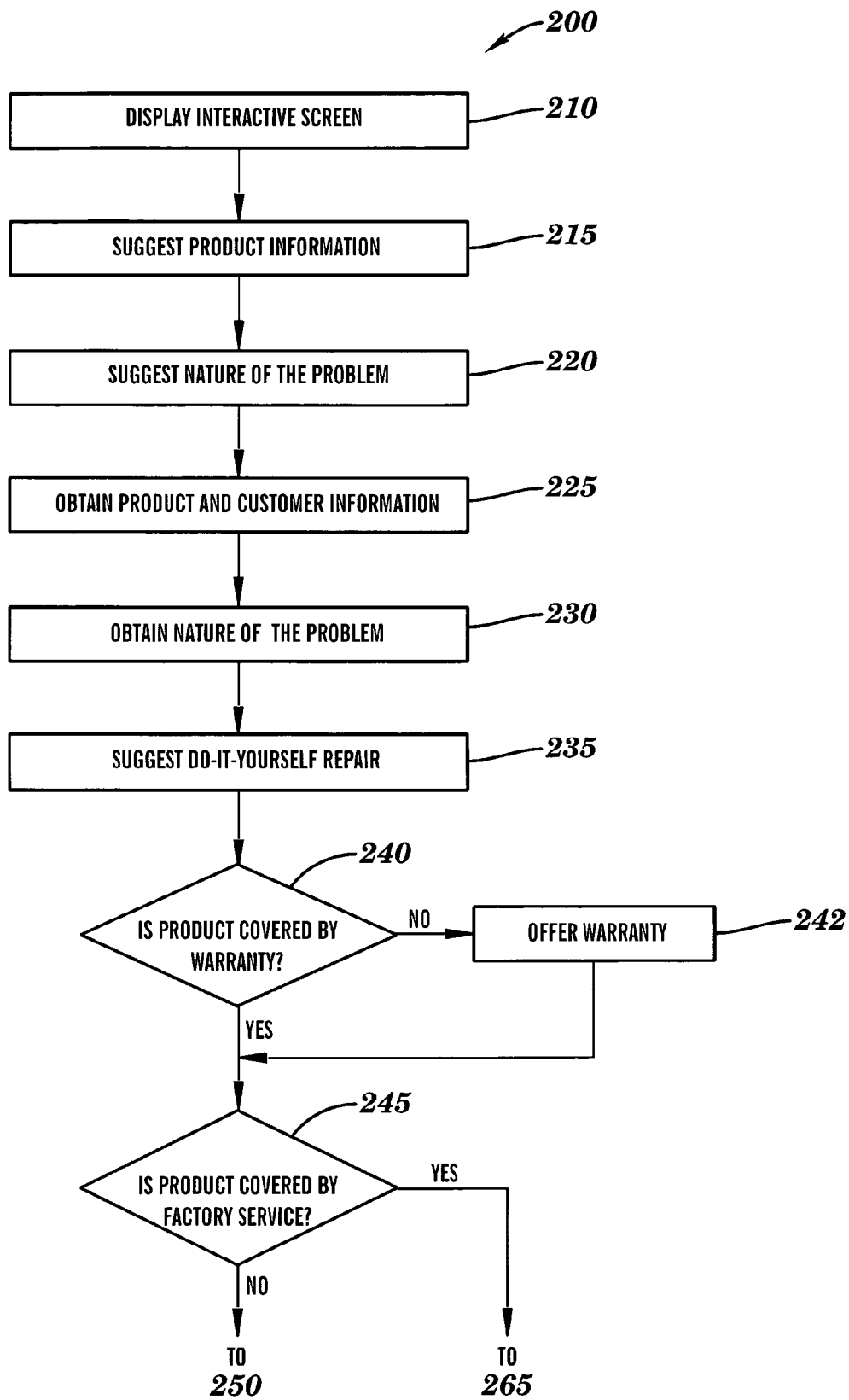
FIGS. 2 and 3 together, illustrate a flow diagram of one example of the logic used for on-line service call scheduling using the system of FIG. 1.

An aspect of the present invention is described with reference to FIGS. 2 and 3 which illustrate a general overview of one example of an on-line service call scheduling process 200. Initially, an interactive screen is displayed (step 210, "Display Interactive Screen"), product information is suggested (step 215, "Suggest Product Information") and a nature of the problem is suggested (step 220, "Suggest Nature of the Problem") to facilitate obtaining various product information and customer information from a user (step 225, "Obtain Product Information") and the nature of the problem from the user (step 230, "Obtain Nature of the Problem").

Figure 4:
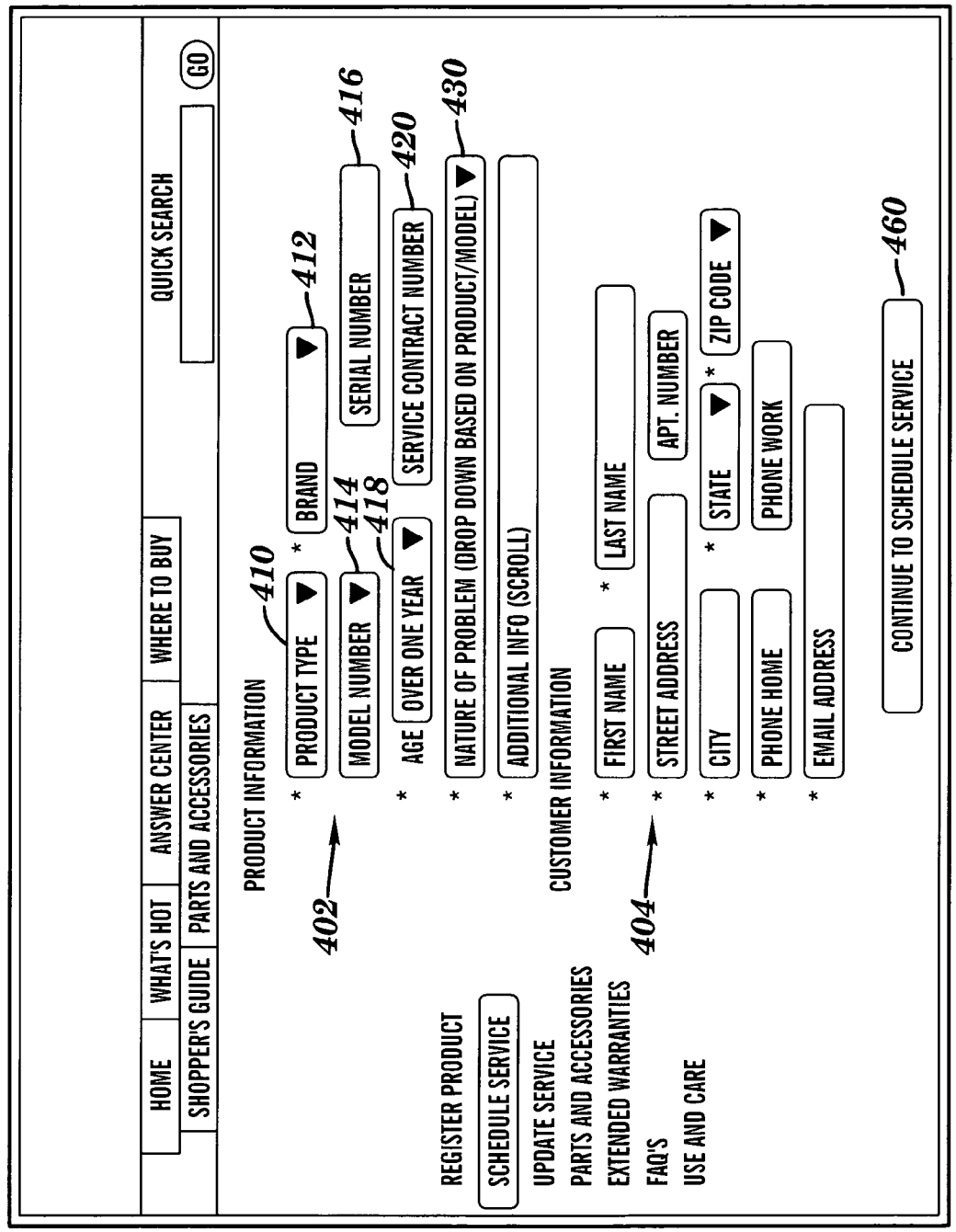
FIG. 4 is an illustration of one example of an interactive screen for prompting and obtaining product and customer information from a user in accordance with one implementation of the process of FIGS. 2 and 3.

FIG. 4 illustrates one example of an interactive screen 400 useful in the performance of process 200 at step 210. Where connection 160 comprises a global computer network, e.g., the Internet or World Wide Web, screen 400 can be displayed on, for example, a monitor of computing unit 140 (FIG. 1) using a standard Web browser. For example, a user at computing unit 140 (FIG. 1) can access an appliance manufacturer's Web site, such as, for example a Web site for the General Electric Company. From the main home page of the appliance manufacturer's Web site, the user may obtain information and/or purchase various products manufactured by the manufacturer, and in particular access, e.g., pull-up, interactive screen 400 for initiating the scheduling a service call.

Interactive screen 400 includes a plurality of product information prompts 402 and customer information prompts 404. Product information prompts 402 include product type 410, product brand 412, product model number 414, product serial number 416, the age of the product 418, product service contract number 420, and a nature of the problem 430.

Desirably, as shown in FIG. 4, the prompts are also data entry fields for input of data by the user via a keyboard or mouse. In addition, suggested product information includes pull-down menus for suggested data items for the product type, the product brand, the product model numbers, as well as suggested nature of the problem. The various suggested data items may be stored and retried from one or more databases.

The list of known problems with the product can be generated or selected from a database of problems for various product types, desirably in real-time, based on the product type, the product brand, and/or the product model number selected or entered by the user. For example, if the product type selected by the user is a refrigerator, a list of problems with refrigerators may include, "ice maker not working", "freezer compartment fails to maintain temperature", "refrigerator compartment fails to maintain temperature", etc. This reduces the number of problems displayed in the pull-down menu so that the user can readily select the appropriate nature of the problem. In addition, if a product model has experienced a certain problem, that problem can be listed first in the suggested nature of the problem for selection by the user.

Interactive screen 400 also prompts a user to enter customer information such as the user's first name, last name, street address, city, state, zip code, and contact information such as a home telephone number, a work telephone number, and an e-mail address. Typically, the customer's information provides the location of the product to be serviced. However, a separate data entry line may be provided for inputting the product's location or confirming the product's location.

Once the product and the customer's information is inputted into and/or selected on the interactive information screen, the user continues by clicking on a "continue to schedule service" button 460, to transmit the product and customer information from computing unit 140 (FIG. 1) to computing unit 120 (FIG. 1).

With reference again to FIGS. 2 and 3, do-it-yourself repair information can be selected from a database of do-it-yourself repair information (step 235, "Suggest Do-It-Yourself Repair"), desirably in real-time, based on the product information, and in particular, from the nature of the problem. For example, the monitor of computing unit 140 (FIG. 1) can indicate that do-it-yourself repair information is available and accessible. Alternatively, do-it-yourself information can be automatically displayed after receipt of the product and customer information.

Warranty validation such as whether the appliance is under warranty service or out of warranty service can be obtained from a database of warranty service information, desirably in real-time, based on the product serial number, service contract number, and/or the customer information (step 240, "Is Product Covered By Warranty"). Typically, a product warranty will have a finite life span. Where the product is not covered by a warranty, the user can be offered a warranty or offered a renewal or extended warranty coverage on the appliance, e.g., using a warranty interactive screen (step 242, "Offer Warranty"). Where the warranty for the product has expired in the recent past, a user can be provided with extended coverage for a fee. If the user extends the warranty, the database of warranty service information is desirably automatically updated.

If the product is covered by a warranty, it is determined whether the product is covered by factory service (step 245, "Is Product Covered by Factory Service"), i.e., where the appliance is serviced by employees of the manufacturer, which is typically provided in major densely populated cities or localities. If the product is covered by factory service, a schedule of currently available appointments for the user is obtained from a database of schedules of available appointments or generated from information regarding available appointments stored in a database (e.g., in or accessed by computing unit 120, FIG. 1), desirably in real-time, based on the product location using, for example, the customer's zip code (step 265, "Obtain Available Appointment").

Figure 3:
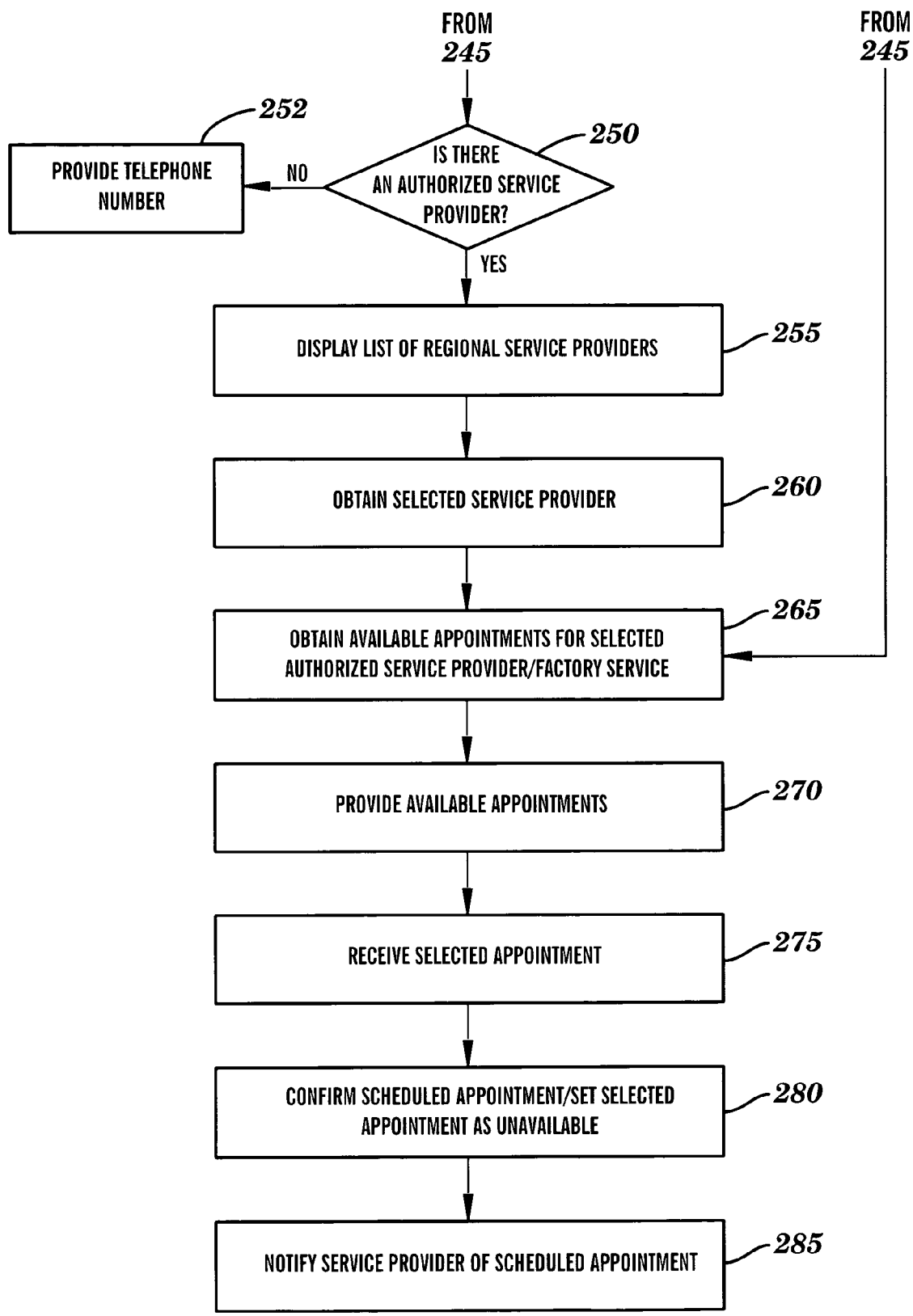

FIG. 5 illustrates one example of an interactive screen 500 displaying a schedule of available service call appointments 520 for the upcoming week (step 270, "Provide Available Appointments, FIG. 3). Shading or colored time slots (e.g., time slot 525) may be used to indicate available times slots for scheduling an appointment.

Figure 6:
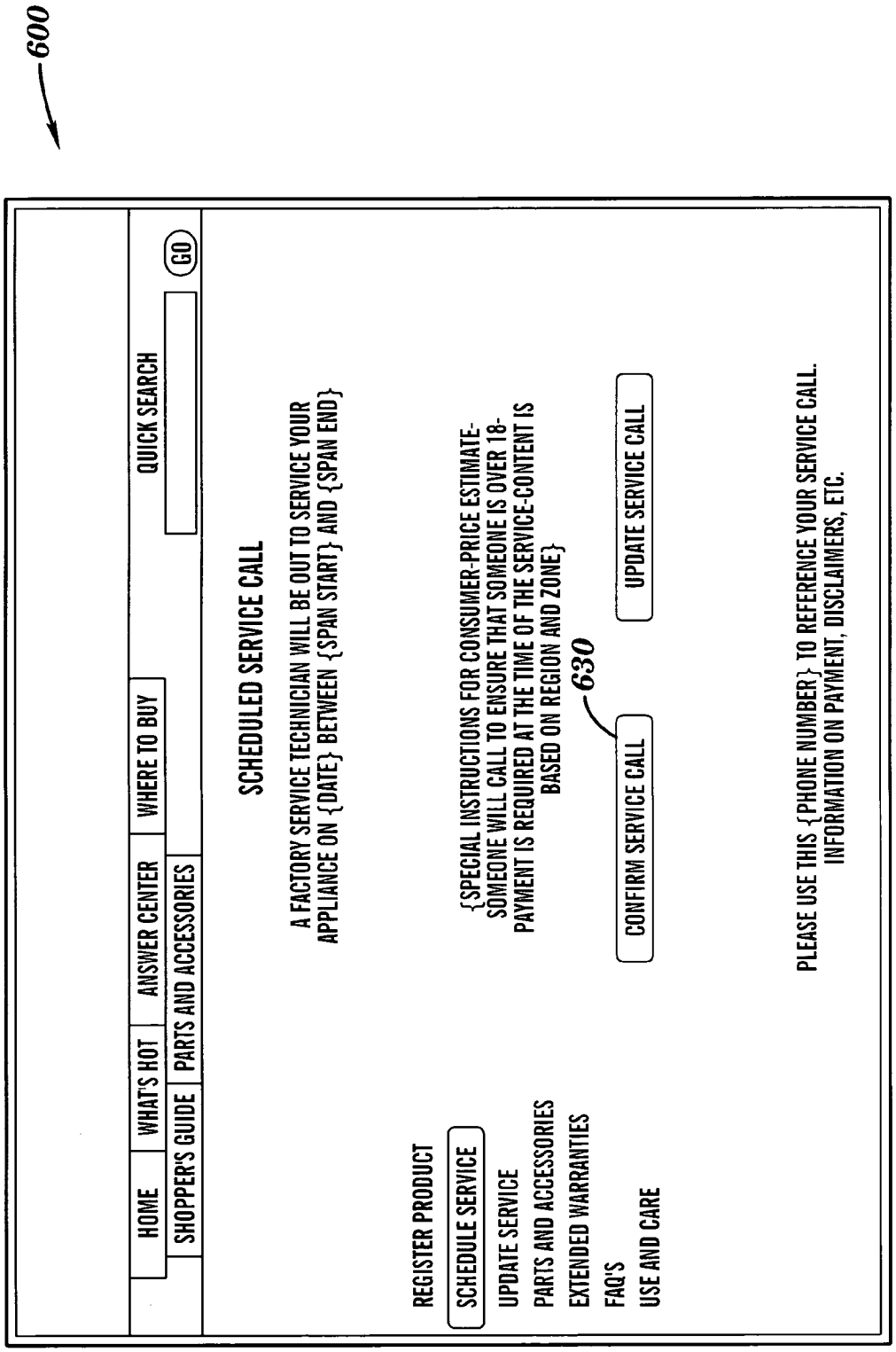
FIG. 6 is an illustration of one example of an interactive screen for requesting user confirmation of a user selected service call appointment in accordance with one implementation of the process of FIGS. 2 and 3.

The user selects, e.g., clicks on, using a mouse or other pointing device, one of the available blocks or time slots. Thereafter, the scheduling process is continued by selecting or clicking on a button 530 to send the selection from computing unit 140 (FIG. 1) to computing unit 120 (FIG. 1) (step 275, "Receive Selected Appointment"). One example of a confirmation screen 600, as shown in FIG. 6, is then displayed, which notes that a factory service technician will be out to service the appliance on the chosen date during the chosen time. At this point, a service call is not yet scheduled.

Additional information may be displayed on confirmation screen 600, for example, a price estimate for the service call, that payment is required at time of the service, a reference number of the appointment, etc. Typically, the price estimate is based on the regional location of the user. In addition, the price estimate may list the fee for making the service call to the home for the technician in diagnosing or confirming the nature of the problem with the appliance, and a price estimate for repairing the problem. The user, after reviewing the estimates of fees, can decide at this point whether to continue to schedule a service call.

The user affirmatively confirms the appointment for the service call by selecting or clicking on a confirm service call button 630. This requires the user to take a positive action to confirm the service call for the available time slot and the estimated fees.

Desirably, a notification screen (not shown) may be displayed in response to selecting button 630, in which the appointment is set as unavailable and identified as being confirmed (step 280, "Confirm Scheduled Appointment/Set Selected Appointment As Unavailable) and that a factory service technician will be out to service the appliance on the selected date during the selected time slot. Thereafter, notification is made to the factory service provider via access to computing environment 100 or via facsimile or e-mail, etc. of the user's confirmed appointment (step 285 "Notify Service Provider"). As noted above, if during the service call at the user's home, the user decides not to repair the appliance, the user would only be required to pay the fee for having the service technician making the visit to the home.

With reference again to FIG. 5, the blocks of time generally span four hours, but could span other amounts of time. Desirably, special instructions are provided to the user and displayed at the bottom of the screen at box 540. Special instructions may, for example, indicate that the service provider can call the user thirty minutes prior to arriving at the appointment, allowing a user to leave from work and meet the service provider at home at the same time. From the present description, it will be appreciated by those skilled in the art that the special instructions may allow a user to select from a list or plurality of different special instructions and include the ability to obtain a preferred telephone number for contact or paging prior to the scheduled appointment. Advantageously, it is possible for computing environment 100 to notify the user automatically via e-mail or facsimile twenty-four hours before the scheduled appointment as a reminder to the user of the scheduled appointment.

The displayed schedule is desirably updated in real-time, so that as time slots fill up as confirmed by users of the system, or open up as time slots become available, e.g., if an appointment is canceled by users. The schedule is updated, for example, by computing unit 120 communicating with and updating the display of the monitor of computing unit 140.

In addition, the schedule of appointments displayed may be based on whether the service call is under a warranty or not as described above with reference to step 240 (FIG. 3). For example, it is desirable to give priority for out of warranty service calls, e.g., provide additional time slots since the user will be paying a fee for the service call compared to a service call under warranty. This provides additional options for users without warranties to schedule a service call and allows for a greater generation of revenue for a factory service provider.

With reference again to inquiry step 245 of FIG. 3, where the appliance is not covered by a manufacturer's factory service, a determination is made as to whether there is a local independent authorized service provider for repairing the appliance (step 250, "Authorized Service Provider"). Typically, computing environment 100 is not linked to or provided with the service call schedules of the various independently operated authorized service providers, although it could be. However, computing environment 100 allows a user to select a preferred date for a service call.

For example, a list of authorized service providers can be obtained from a database of authorized service providers based on the regional location of the user using the customer's zip code. Desirably, the authorized service provider is obtained based also on the product brand, add/or the product line. For example, while a regional service provider may be found, the service provider may not be authorized to repair a particular appliance brand or a particular product line such as a top-of-the-line refrigerator model.

If there is not an authorized service provider in the regional location, a phone number can be provided to the user (step 252, "Suggest Phone Number"). For example, a manufacturer's general information phone number, non-local service provider, etc., may be provided.

If there is more than one authorized service provider, a list of the authorized service providers is displayed for review by the user, (step 255, "Display List of Service Providers"). FIG. 7 illustrates one example of an authorized service provider interactive screen 700 identifying two authorized service providers. An authorized service provider is obtained by the user selecting one of the listed authorized service providers (step 260, "Obtain Selected Service Provider", FIG. 3) If there is only one authorized service provider, this screen can be skipped over.

With reference again to FIG. 3, available appointments for the selected service provider are obtained or retrieved from a database of available appointments for a plurality of authorized service providers, desirably in real-time (step 265, "Obtain Available Appointment"). FIG. 8, illustrates one example of an interactive screen 800 displaying a schedule of available service call appointments 820 for the upcoming week (step 270, "Provide Available Appointment", FIG. 3.) Shading or colored time slots may be used to indicate available times slots for scheduling a preferred appointment.

Where a user is using the system to schedule a service call and the time that the user is accessing the system is before noon, available appointment time slots will be available for the afternoon and the following days. If the user is accessing the system in the afternoon, available time slots for the next day and thereafter are displayed.

By selecting a preferred available date, and confirming the selection by clicking on a button 830, the selection is transmitted from computing unit 140 (FIG. 1) to computing unit 120 (FIG. 1). Upon receipt of the selected appointment, (step 275, "Receive Selected Appointment"), the selected preferred appointment is set as unavailable and confirmation of the requested scheduled appointment is returned to the user (step 280, "Confirm Scheduled Appointment/Set Selected Appointment As Unavailable"). Depending on the total capacity of the service provider, more than one appointment may be available for a time slot. For example, more than one technician may be available for one or more of the time slots.

The preferred scheduled appointment is not guaranteed or scheduled at this point. Thereafter, notification is made to the authorized service provider via a facsimile, e-mail, etc. of the user's preferred scheduled appointment, (step 285, "Notify Service Provider"). Information provided to the authorized service providers may include the user's name, contact information, product information, and the preferred appointment. Thereafter, the authorized service provider can get back to the user and confirm or reschedule the appointment.

Authorized service providers may comprise two different types of authorized service providers. For example, one type of authorized service provider may include authorized service providers who are under an agreement or contract with the appliance manufacturer to provide service similar to factory service. Such an agreement may include coverage under warranty, as well as where the authorized service provider agrees to respond immediately back to the user after notification of the user's selected preferred appointment date. The other type of authorized service provider may not be under an agreement or contract with the manufacturer but have satisfied certain requirements for becoming an authorized service providers for certain product lines and/or models. When obtaining an available authorized service providers for a user, computing environment 100 can preferentially list service providers which are under an agreement or a contract for selection by the user as described above.

Desirably, if the user purchased the appliance from a store, e.g., Joe's Appliances, which is also an authorized service provider, when providing a list of the regional authorized service providers to the user, Joe's Appliances can be positioned at the top of the list. A database can be used for storing user purchases with authorized service providers.

Where there is no agreement between a regional authorized service provider and the appliance manufacturer, a list of authorized service providers along with contact information such as a telephone number is displayed for the user to use in contacting the service provider directly for a service call. The list of authorized service providers, while not under agreement to respond immediately to a user, is particularly important to the user where the product is under warranty and in order to have the repair covered under a manufacturer's warranty, repair by an authorized service provider is required.

From the present description, the system and scheduling technique of the present invention provides a seamless approach from the user's perspective in scheduling a factory service provider or authorized service provider for repair of a product such as a home appliance.

While computing environment 100 is desirably suitable for all users or consumers for scheduling a service call for repair of an appliance over the Internet, computing environment 100 may be linked to business-to-business related systems as well. For example, computing environment 100 along with the logic and interactive screens described above can be accessed and used by businesses such as appliance retailers for scheduling a factory service provider or an authorized service provider service call for a product on the showroom floor such as an appliance having a broken handle. In addition, the system can be used by the store personnel where a user who has purchased an appliance at an appliance retailer returns to the retailer requesting repair of the appliance.

Computing environment 100, after a user has scheduled an appointment for a service call, desirably is provided with updating capabilities to allow the user to update the service call. For example, should a conflict with the scheduled appointment arise, the user would be able to enter the system and reschedule the appointment for a different time and/or a different date. The system may allow the user to retrieve information relating to the scheduled appointment by entering the customer's last name or the customer's telephone number. Alternatively, a toll-free number can be provided to the user, in the event that the customer's last name or telephone number fails to provide retrieval of the user's scheduled appointment. Where two or more scheduled appointments have been made, for example, by maintenance personnel of an apartment, the list of the appliances can be displayed in a screen for the user to select for updating.

FIG. 9 illustrates one example of an update service call interactive screen 900 for a factory service provider. Desirably, a scheduled service call appointments 950 is indicated, for example, in the color red. The user has the option of keeping the originally scheduled service call appointment or can select a new available appointment from the displayed time slots. As discussed above, the new time and date are displayed for the user to confirm. Thereafter, the user is notified of the confirmed new scheduled appointment.

Where the originally scheduled service call was for an authorized service provider, instead of update service call interactive screen 900, the user is provided with the name and the telephone number for contacting the originally selected service provider, e.g., Joe's Appliances as noted above.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

The invention claimed is:

1. A method of enabling scheduling of a service call in a computing environment, the method comprising:
   obtaining product information regarding a product from a user of the computing environment;
   validating product warranty service information of the product in real-time from a database including warranty service information based on at least one of the product information and customer information obtained from the user;
   establishing a priority order to a service call among a plurality of service calls based on the product warranty service information, a higher priority given to a service call regarding a product that does not have a warranty than a priority given to a service call regarding a product that has a warranty;
   determining by a first computing unit including a web browser, whether the product is serviced by a manufacturer of the product or a service provider different than the manufacturer;
   automatically providing to the user, from whom the product information is obtained, at least one available appointment based on the priority order within a calendar schedule in real-time for scheduling a service call with at least one of the manufacturer and the service provider based on the product information and on said determination made by the first computing unit without interaction between the user and any other human being, and enabling the user to select one available appointment in real-time for at least one service provider from the calendar schedule; and
   automatically providing a service call price estimate that varies based on a regional location of the user, without interaction between the user and any other human being.

2. The method of claim 1, wherein the product information comprises a location of the product, and at least one of a product type, a product manufacturer, and a product model number, and wherein the at least one available appointment is based on the location of the product.

3. The method of claim 1, wherein the automatically providing comprises selecting the at least one available appointment from a plurality of appointments, and wherein the plurality of appointments are associated with a plurality of service providers at a plurality of locations; and providing to the user a preferred service provider.

4. The method of claim 1, wherein the automatically providing comprises determining in real-time the at least one available appointment.

5. The method of claim 1, wherein the automatically providing comprises updating in real-time the at least one available appointment as unavailable in the event another user has selected the at least one available appointment.

6. The method of claim 1, further comprising providing suggested product information to the user for use by the user in providing the product information.

7. The method of claim 6, wherein the suggested product information comprises at least one of a product type, a product manufacturer, and a product model number.

8. The method of claim 1, further comprising providing to the user a suggested nature of a problem based on the product information.

9. The method of claim 1, further comprising obtaining one of the at least one available appointment selected by the user.

10. The method of claim 9, further comprising notifying the service provider of the one of the at least one available appointment selected by the user.

11. The method of claim 9, further comprising setting the one of the at least one available appointment selected by the user as unavailable for other users.

12. The method of claim 1, further comprising validating warranty coverage for the product based on the product information.

13. The method of claim 1, further comprising obtaining a nature of a problem of the product, and providing do-it-yourself repair information based on the nature of the problem.

14. The method of claim 1, wherein the obtaining comprises obtaining the product information at the first computing unit from input of the product information by the user at a second computing unit coupled to the first computing unit via a communications network.

15. The method of claim 14, wherein the communications network is a global computer network.

16. The method of claim 1, wherein said service call is for repair of a home appliance, the authorized service provider further comprising at least one of at least one service provider under an agreement with the manufacturer to provide service similar to factory service coverage under warranty and at least one service provider satisfying requirements for becoming one authorized service provider for the product, wherein said service call is for repair of a home appliance.

17. The method of claim 1, further comprising obtaining a nature of a problem of the product, and providing do-it-yourself repair information based on the nature of the problem.

18. The method of claim 1, wherein said determining whether the product is serviced comprises determining whether the product is serviced by an authorized service provider if the product is not serviced by the manufacturer, the authorized service provider having agreed with the manufacturer to provide a service similar to that provided by the manufacturer.

19. The method of claim 1, further comprising providing a priority to the service call if the product is out of warranty, wherein said providing a priority includes providing the priority to the service call over a service call corresponding to a product that is under warranty.

20. The method of claim 1, wherein the at least one available appointment includes at least two available appointments, said method further comprising providing a number of the at least two available appointments if the product is out of warranty, wherein said providing a number includes providing the at least two available appointments that are higher in number than a number of at least one available appointment corresponding to a product under warranty.

21. The method of claim 1, further comprising providing, via the first computing unit, a reminder of the service call to the user, wherein said providing a reminder of the service call to the user includes providing the reminder before a time at which the service call is scheduled.

22. The method of claim 1 further comprising selecting, via a graphical user interface, a portion of the calendar schedule for scheduling a service call.

23. The method of claim 1 further comprising prioritizing, by the first computing unit, a problem associated with the product upon determining that the product has encountered the problem.

24. The method of claim 1 further comprising:
determining, by the first computing unit, a procedure for fixing a problem associated with the product; and
displaying, by the first computing unit, the procedure to the user.

25. The method of claim 1 further comprising:
determining, by the first computing unit, whether the product is covered by a first warranty; and
offering, by the first computing unit to the user, a second warranty upon determining that the product is not covered by the first warranty.

26. A system for enabling scheduling of a service call in a computing environment, said system comprising:
at least one processor adapted to obtain product information regarding a product from a user of the computing environment; and
said at least one processor adapted to:
validate product warranty service information of the product in real-time from a database including warranty service information based on at least one of the product information and customer information obtained from the user;
establish a priority order to a service call among a plurality of service calls based on the product warranty service information, a higher priority given to a service call regarding a product that does not have a warranty than a priority given to a service call regarding a product that has a warranty;
determine whether the product is serviced by a manufacturer of the product or a service provider different than the manufacturer;
provide to the user, from whom the product information is obtained, at least one available appointment based on the priority order in real-time for scheduling a service call, wherein the at least one available appointment is based on the product information and on the determination made by said at least one processor, and said at least one processor adapted to provide the at least one available appointment based on a determination to display the at least one available appointment within a calendar schedule in real-time for scheduling the service call; and
provide to the user, prior to scheduling the service call, a price estimate that varies based on a regional location of the user for the service call without interaction between the user and any other human being.

27. The system of claim 26, wherein the product information comprises a location of the product, and at least one of a product type, a product manufacturer, and a product model number, and wherein the at least one available appointment is based on the location of the product.

28. The system of claim 26, wherein said at least one processor is adapted to select the at least one available appointment from at least one possible appointment for at least one service provider.

29. The system of claim 26, wherein said at least one processor is adapted to select the at least one available appointment from a plurality of appointments, and wherein the plurality of appointments are associated with a plurality of service providers at a plurality of locations.

30. The system of claim 26, wherein said at least one processor is adapted to determine in real-time the at least one available appointment.

31. The system of claim 26, wherein said at least one processor is adapted to update in real-time the at least one available appointment as unavailable in the event another user has selected the at least one available appointment.

32. The system of claim 26, wherein said at least one processor is adapted to provide suggested product information to the user for use by the user in providing the product information.

33. The system of claim 32, wherein the suggested product information comprises at least one of a product type, a product manufacturer, and a product model number.

34. The system of claim 26, wherein said at least one processor is adapted to provide to the user a suggested nature of a problem based on the product information.

35. The system of claim 26, wherein said at least one processor is adapted to obtain one of the at least one available appointment selected by the user.

36. The system of claim 35, wherein said at least one processor is adapted to notify the service provider of the one of the at least one available appointment selected by the user.

37. The system of claim 35, wherein said at least one processor is adapted to set the one of the at least one available appointment selected by the user as unavailable for other users.

38. The system of claim 26, wherein said at least one processor is adapted to validate warranty coverage for the product based on the product information.

39. The system of claim 26, wherein said at least one processor is adapted to obtain a nature of a problem of the product, and to provide do-it-yourself repair information based on the nature of the problem.

40. The system of claim 26, wherein said at least one processor is adapted to obtain the product information at a first computing unit from input of the product information by the user at a second computing unit coupled to the first computing unit via a communications network.

41. The system of claim 40, wherein the communications network is a global computer network.

42. The system of claim 26, wherein the service call is for repair of a home appliance, the authorized service provider further comprising at least one of a service provider under an agreement with the manufacturer to provide service similar to factory service for coverage under warranty and a service provider satisfying requirements for becoming one authorized service provider for the product.

43. The system of claim 26, wherein to determine whether the product is serviced said at least one processor is adapted to determine whether the product is serviced by an authorized service provider if the product is not serviced by the manufacturer, and the authorized service provider has agreed with the manufacturer to provide a service similar to that provided by the manufacturer.

44. A system for enabling scheduling of a service call for repair of a home appliance in a computing environment, said system comprising:
means for obtaining product information regarding a product at a first computing unit from input of the product information by the user at a second computing unit coupled to the first computing unit via a communications network, wherein said first computing unit includes a web browser, is configured to determine whether the product is serviced by a manufacturer of the product or a service provider different than the manufacturer;

means for validating product warranty service information of the product in real-time from a database including warranty service information based on at least one of the product information and customer information obtained from the user;

means for establishing a priority order to a service call among a plurality of service calls based on the product warranty service information, a higher priority given to a service call regarding a product that does not have a warranty than a priority given to a service call regarding a product that has a warranty;

means for providing from the first computing unit to the user that input the product information at the second computing unit at least one available appointment based on the priority order in real-time for scheduling a service call based on the product information and the determination made by said first computing unit, wherein the means for providing provides without interaction between the user and any other human being, and said means for providing provides the at least one available appointment based on a determination to display to the user the at least one available appointment within a calendar schedule in real-time for scheduling the service call; and means for providing from the first computing unit to the user, prior to scheduling the service call, a price estimate that varies based on a regional location of the user for the service call without interaction between the user and any other human being.

45. The system of claim 44, wherein the product information comprises a location of the product, and at least one of a product type, a product manufacturer, and a product model number, and wherein the at least one available appointment is based on the location of the product.

46. The system of claim 44, further comprising means for selecting the at least one available appointment from a plurality of appointments, and wherein the plurality of appointments are associated with a plurality of service providers at a plurality of locations.

47. The system of claim 44, wherein said means for providing comprises means for determining in real-time the at least one available appointment.

48. The system of claim 44, wherein said means for providing comprises means for updating in real-time the at least one available appointment as unavailable in the event another user has selected the at least one available appointment.

49. The system of claim 44, further comprising means for obtaining a nature of a problem of the product, and means for providing do-it-yourself repair information based on the nature of the problem.

50. The system of claim 44, further comprising means for obtaining one of the at least one available appointment selected by the user.

51. The system of claim 50, further comprising means for notifying the service provider of the one of the at least one available appointment selected by the user.

52. The system of claim 50, further comprising means for setting the one of the at least one available appointment selected by the user as unavailable for other users.

53. At least one program storage device readable by a machine, tangibly embodying at least one program of instructions executable by the machine to perform a method of enabling scheduling a service call, the method comprising:

obtaining product information regarding a product from a user;

validating product warranty service information of the product in real-time from a database including warranty service information based on at least one of the product information and customer information obtained from the user;

establishing a priority order to a service call among a plurality of service calls based on the product warranty service information, a higher priority given to a service call regarding a product that does not have a warranty than a priority given to a service call regarding a product that has a warranty;

determining, by the machine, whether the product is serviced by a manufacturer of the product or a service provider different than the manufacturer;

automatically providing to the user, from whom the product information is obtained, at least one available appointment based on the priority order in real-time for scheduling a service call based on the product information and said determination made by the machine, wherein said automatically providing includes providing without interaction between the user and any other human being, and said automatically providing includes providing based on a determination to display the at least one available appointment within a calendar schedule in real-time for scheduling the service call; and automatically providing to the user, prior to scheduling the service call, a price estimate that varies based on a regional location of the user for the service call without interaction between the user and any other human being.

54. The at least one program storage device of claim 53, wherein the product information comprises a location of the product, and at least one of a product type, a product manufacturer, and a product model number, and wherein the at least one available appointment is based on the location of the product.

55. The at least one program storage device of claim 53, wherein the automatically providing comprises selecting the at least one available appointment from a plurality of appointments, and wherein the plurality of appointments are associated with a plurality of service providers at a plurality of locations.

56. The at least one program storage device of claim 53, wherein the automatically providing comprises determining in real-time the at least one available appointment.

57. The at least one program storage device of claim 53, wherein the automatically providing comprises updating in real-time the at least one available appointment as unavailable in an event another user has selected the at least one available appointment.

58. The at least one program storage device of claim 53, further comprising obtaining a nature of a problem of the product, and providing do-it-yourself repair information based on the nature of the problem.

59. The at least one program storage device of claim 53, further comprising obtaining one of the at least one available appointment selected by the user.

60. The at least one program storage device of claim 59, further comprising notifying the service provider of the one of the at least one available appointment selected by the user.

61. The at least one program storage device of claim 59, further comprising setting one of the at least one available appointment selected by the user as unavailable for other users.

* * * * *